United States Patent
Lee et al.

(10) Patent No.: US 11,085,707 B2
(45) Date of Patent: Aug. 10, 2021

(54) INTERNAL HEAT EXCHANGER DOUBLE-TUBE STRUCTURE OF AIR CONDITIONING SYSTEM HAVING ALTERNATIVE REFRIGERANT APPLIED THERETO

(71) Applicant: PYONGSAN Corp., Asan-si (KR)

(72) Inventors: Bang-Soo Lee, Cheonan-si (KR); Jeong-Ho Ha, Uiwang-si (KR); Sang-Min Lee, Cheonan-si (KR); Ki-Youl Song, Pyeongtaek-si (KR)

(73) Assignee: PYONGSAN Corp., Asan-si (KR)

( * ) Notice: Subject to any disclaimer, the term of this patent is extended or adjusted under 35 U.S.C. 154(b) by 9 days.

(21) Appl. No.: 16/086,611

(22) PCT Filed: Jul. 22, 2016

(86) PCT No.: PCT/KR2016/008019
§ 371 (c)(1),
(2) Date: Sep. 20, 2018

(87) PCT Pub. No.: WO2017/164463
PCT Pub. Date: Sep. 28, 2017

(65) Prior Publication Data
US 2019/0100079 A1    Apr. 4, 2019

(30) Foreign Application Priority Data
Mar. 21, 2016 (KR) .......... 10-2016-0033651

(51) Int. Cl.
*F28D 7/10*    (2006.01)
*F28F 1/36*    (2006.01)
(Continued)

(52) U.S. Cl.
CPC ........... *F28F 1/36* (2013.01); *B60H 1/00342* (2013.01); *F16L 9/18* (2013.01); *F16L 53/70* (2018.01);
(Continued)

(58) Field of Classification Search
CPC ... F28D 7/106; F28F 1/36; F28F 1/426; F28F 2210/06
(Continued)

(56) References Cited

U.S. PATENT DOCUMENTS 2,060,936 A * 11/1936 Haag, Jr. ................. F28D 7/026
165/156
3,070,968 A * 1/1963 Gardner ................. A62B 21/00
165/156

(Continued)

FOREIGN PATENT DOCUMENTS

DE          3408626 A1 *  9/1985  ............... F28F 1/36
KR    10-2009-0016623 A   2/2009
(Continued)

OTHER PUBLICATIONS

International Search Report for PCT/KR2016/008019 dated Dec. 2, 2016 from Korean Intellectual Property Office.

*Primary Examiner* — Leonard R Leo
(74) *Attorney, Agent, or Firm* — Revolution IP, PLLC (57) ABSTRACT

The present invention relates to an internal heat exchanger double-tube structure of an air conditioning system having an alternative refrigerant applied thereto for heat exchange between a low-temperature low-pressure refrigerant discharged from an evaporator and a high-temperature high-pressure refrigerant discharged from an condenser, the double-tube structure including: an inner pipe having a channel through which the low-temperature low-pressure refrigerant discharged from the evaporator flows; and an (Continued)

outer pipe surrounding the inner pipe and having a channel through which high-temperature high-pressure refrigerant flows, wherein the inner pipe has a spiral groove forming a channel on an outer side thereof, and the spiral groove is a recessed groove for generating a vortex that increase a channel volume where high-temperature high-pressure liquid flows inward and reduces a vortex of flowing fluid.

4 Claims, 11 Drawing Sheets

(51) Int. Cl.
| | |
|---|---|
| *F28F 1/42* | (2006.01) |
| *F16L 53/70* | (2018.01) |
| *F25B 40/00* | (2006.01) |
| *B60H 1/00* | (2006.01) |
| *F25B 41/40* | (2021.01) |
| *F28D 7/02* | (2006.01) |
| *F16L 9/18* | (2006.01) |
| *F16L 53/75* | (2018.01) |
| *F28D 21/00* | (2006.01) |
| *B60H 1/32* | (2006.01) |

(52) U.S. Cl.
CPC .............. *F16L 53/75* (2018.01); *F25B 40/00* (2013.01); *F25B 41/40* (2021.01); *F28D 7/02* (2013.01); *F28D 7/10* (2013.01); *F28D 7/106* (2013.01); *F28F 1/426* (2013.01); *B60H 2001/3291* (2013.01); *F28D 2021/0068* (2013.01); *F28F 2210/06* (2013.01)

(58) Field of Classification Search
USPC .................................................. 165/154, 156
See application file for complete search history.

(56) References Cited

U.S. PATENT DOCUMENTS

| | | | | |
|---|---|---|---|---|
| 4,796,693 | A * | 1/1989 | Kastner | F28F 1/36 165/133 |
| 5,259,448 | A * | 11/1993 | Masukawa | F28F 1/40 165/133 |
| 6,000,466 | A * | 12/1999 | Aoyagi | F28F 1/40 165/133 |
| 7,841,391 | B2 * | 11/2010 | Hao | F28F 1/40 165/133 |
| 8,753,752 | B2 * | 6/2014 | Fujii | F28F 13/02 165/133 |
| 2006/0096314 | A1 * | 5/2006 | Nakamura | F16L 7/00 62/498 |
| 2013/0025834 | A1 * | 1/2013 | Choi | F28F 1/40 165/156 |

FOREIGN PATENT DOCUMENTS

| | | |
|---|---|---|
| KR | 10-2009-0029891 A | 3/2009 |
| KR | 10-2010-0020795 A | 2/2010 |
| KR | 10-2011-0104141 A | 9/2011 |
| KR | 10-2015-0010826 A | 1/2015 |

\* cited by examiner

INTERNAL HEAT EXCHANGER DOUBLE-TUBE STRUCTURE OF AIR CONDITIONING SYSTEM HAVING ALTERNATIVE REFRIGERANT APPLIED THERETO

The present invention relates to an internal heat exchanger double-tube structure of an air conditioning system having an alternative refrigerant applied thereto and, more particularly, an internal heat exchanger double-tube structure of an air conditioning system having an alternative refrigerant applied thereto that improves the performance of a heat exchanger by providing a vertex-generating dimple structure to a double pipe and improves performance by being necessarily applied to an air conditioning system that has to use an alternative refrigerant.

BACKGROUND ART

In general, an automotive air conditioning system is an automotive built-in part installed to heat and cool the interior of a vehicle in summer and winter or to ensure clear front and rear visual fields for the driver by removing frost on the windshield in a rainy day or in winter.

Such an air conditioning system generally includes both of a cooling system and a heating system, so it cools/heats or ventilates the interior of a vehicle by selectively suctioning external air internal air, heating or cooling the air, and then blowing the air into the vehicle.

A common cooling system of an air conditioning system includes a cooling cycle in which a compressor 1 compressing and sending out a refrigerant, a condenser 2 condensing a high-pressure refrigerant from the compressor 1, for example, an expansion valve 3 throttling a refrigerant condensed into liquid by the condenser 2, and an evaporator 4 cooling air to be discharged to an interior through an endothermic action by latent heat of evaporation of a refrigerant by evaporating a low-pressure liquid-state refrigerant throttled by the expansion valve 3 through heat exchange with air blown into the a vehicle are connected through a refrigerant pipe 5. The cooling system cools the interior of a vehicle through the following refrigerant circulation process.

When a cooling switch of an automotive air conditioning system is turned on, the compressor is started by power from an engine, suctions and compresses a lower-temperature low-pressure gas-state refrigerant, and then sends out the refrigerant in a high-temperature high-pressure gas state to the condenser 2, and the condenser 2 condenses the gas-state refrigerant into high-temperature high-pressure liquid by making the gas-state refrigerant exchange heat with external air. Next, the liquid-state refrigerant discharged in a high-temperature high-pressure state from the condenser 2 rapidly expands due to throttling through the expansion valve 3, so it is sent to the evaporator 4 in a low-temperature low-pressure wet-saturation state, and the evaporator 4 makes the refrigerant exchange heat with air sent into the vehicle by a blower (not shown). The refrigerant is evaporated and discharged in a low-temperature low-pressure gas state from the evaporator 4 and then suctioned back into the compressor 2, thereby recirculating in the cooling cycle. In the circulation process of a refrigerant, as described above, the air sent by the blower is cooled through the evaporator by the latent heat of evaporation of the liquid-state refrigerant circulating in the evaporator and is then discharged to the interior of a vehicle, whereby the interior of the vehicle is cooled.

Meanwhile, a receiver drier (not shown) that separates the gas-state refrigerant and the liquid-state refrigerant is disposed between the condenser 2 and the expansion valve 3 such that only the liquid-state refrigerant is supplied to the expansion valve 3.

The cooling efficiency of the air conditioning system that performs cooling using the cooling cycle depends on various factors. In the factors, the degree of overcooling of the high-pressure refrigerant immediately before it is throttled by the expansion valve and the degree of overheating of the low-pressure refrigerant discharged from the evaporator have an influence on the fluidity of the refrigerant, the amount of pressure drop in the evaporator, the overheating area of the evaporator (some area at the refrigerant outlet of the evaporator), and the volume efficiency of the compressor, whereby they remarkably influence the cooling efficiency of the air conditioning system.

For example, when the degree of overcooling of the refrigerant before throttling, the specific volume of the refrigerant is decreased, so the flow of the refrigerant is stabilized and the amount of pressure drop of the refrigerant in the evaporator is decreased. Accordingly, the cooling efficiency of the air conditioning system is increased and power consumption by the compressor is reduced. However, when the degree of overheating of the low-pressure refrigerant discharged from the evaporator is not appropriately maintained, the overheating area of the evaporator where a relative temperature set for complete evaporation of a refrigerant to prevent a liquid-state refrigerant flowing into the compressor should be increased, so the cooling performance of the air conditioning system is reduced.

Accordingly, the cooling performance of automotive air conditioning systems is generally increased when the degree of overcooling of a refrigerant before throttling is increased and the degree of overheating of the refrigerant discharged from the evaporator is appropriately maintained.

Figure 10:
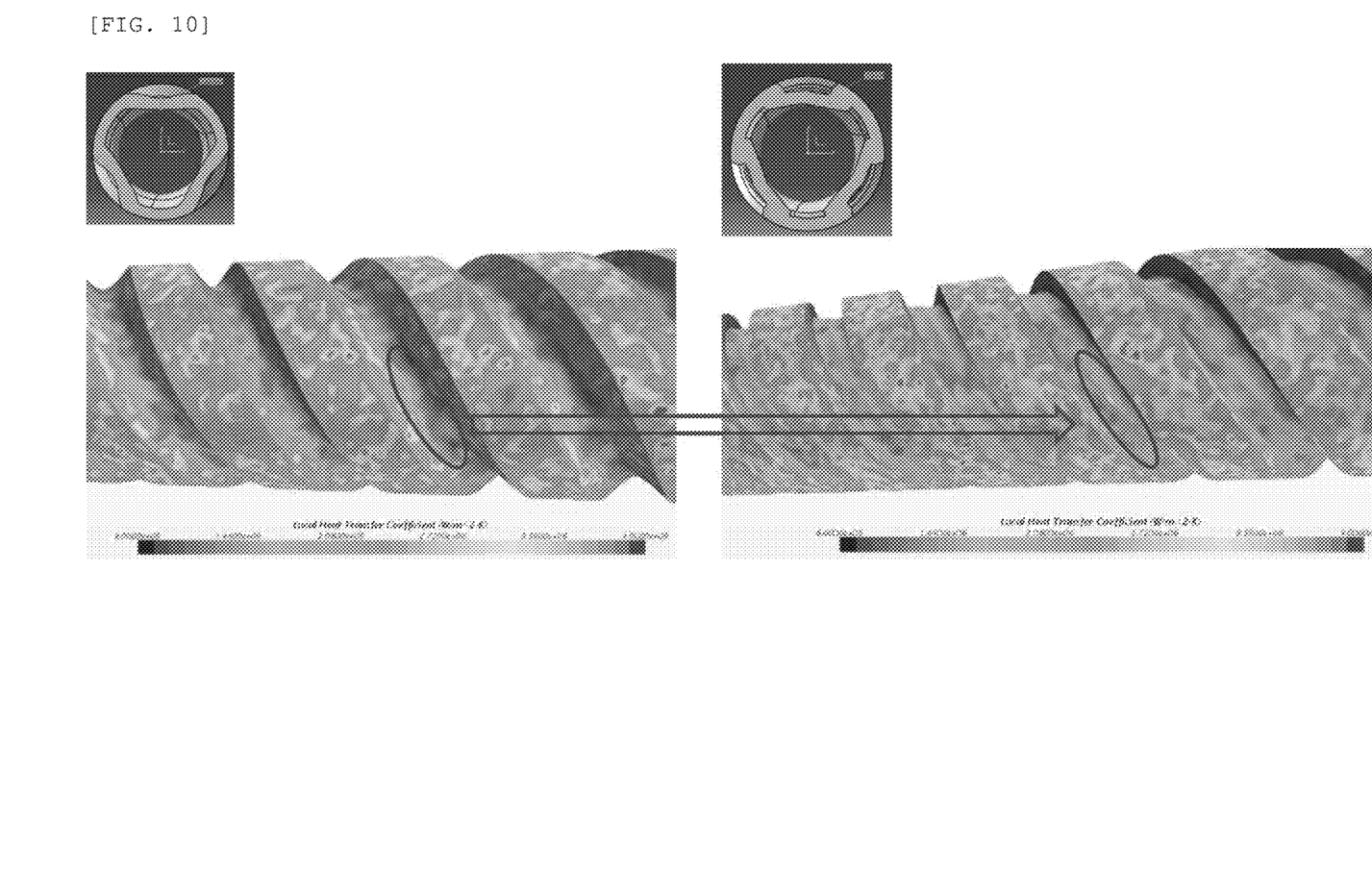
FIG. 10 is an exemplary view of another comparative experiment program in which heat exchange according to a double tube having a fundamental spiral shape and a double tube of the present invention is performed.

Accordingly, there have been various attempts to overcool a high-temperature high-pressure liquid-state refrigerant that is throttled by the expansion valve before flowing into the evaporator and to appropriately maintain the degree of overheating of the refrigerant discharged from the evaporator 4 in order to improve cooling performance of automotive air conditioning systems. At present, as shown in FIG. 10, an internal heat exchanger 10 that overcools a high-temperature high-pressure liquid-state refrigerant that is not throttled yet and appropriately maintains the degree of overheating of the low-pressure refrigerant discharged from the evaporator 4 by making a high-temperature high-pressure refrigerant flowing into expansion valve and a low-temperature low-pressure gas-state refrigerant discharged from the evaporator 4 exchange heat with each other is generally used.

The internal heat exchanger 10 stabilizes flow of the refrigerant flowing into the evaporator 4 and reduces the amount of pressure drop of a refrigerant in the evaporator 4 by making the high-temperature high-pressure refrigerant before being throttled by the expansion valve 3 and the low-temperature low-pressure gas-state refrigerant discharged from the evaporator 4 exchange heat with each other. Further, the internal heat exchanger 10 can reduce the overheating area (not shown) of the evaporator 4 where temperature is relatively high because it is set such that a refrigerant can be completely evaporated to prevent a liquid-state refrigerant from flowing into the compressor 1.

Figure 13:
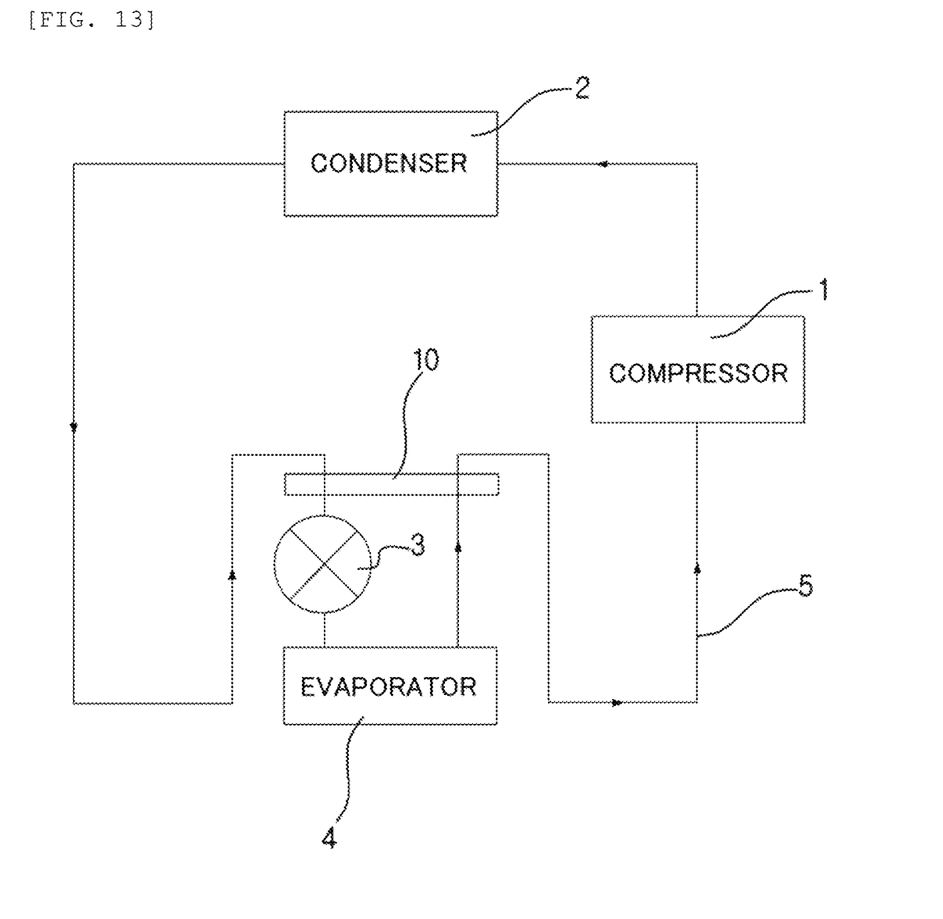
FIG. 13 is a flowchart showing a common cooling/heating system of an air conditioning system of the related art.

Accordingly, as shown in FIG. 13, when the internal heat exchanger 10 is applied to the cooling system, the specific volume (area) of the refrigerant flowing into the evaporator 4 is reduced and the amount of pressure drop of the refrigerant in the evaporator 4 is decreased, so the flow of a refrigerant in cooling tubes in the evaporator 4 can be stabilized. Further, the refrigerant flowing into the compressor 1 can be overheated after being discharged from the evaporator 3, so the overheating area of the evaporator 4 that reduces the cooling performance of an air conditioning system due to relatively high temperature can be reduced, so the cooling efficiency of the air conditioning system can be considerably increased. As a result, the compressor 1, the condenser 2, and the evaporator 4 are made efficient, so it is possible to improve the efficiency of the air conditioning system and reduce the size of the air conditioning system.

Figure 14:
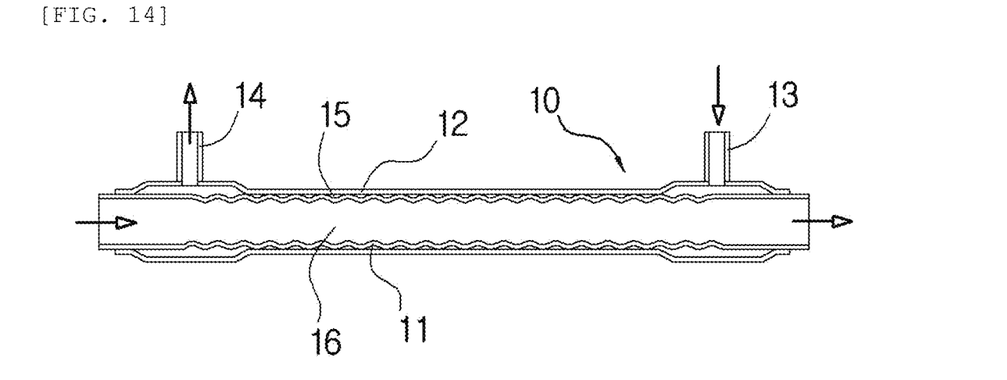
FIG. 14 is a schematic state view showing a heat exchanger in stalled in the cooling/heating system of FIG. 13.

As shown in FIG. 14, the internal heat exchanger 10 includes an inner pipe 11 through which a low-temperature low-pressure refrigerant flows and an outer pipe 12 that is coupled to the outer side of the inner pipe in a double-tube structure and through which a high-temperature high-pressure refrigerant flows.

The inner pipe 11 is a spiral pipe for minimizing a channel area change when it bends and the outer pipe 12 is a circular pipe.

Inlet and output pipes 13 and 14 for inflow and outflow of a refrigerant are coupled to both ends of the outer pipe 12.

The inlet pipe 13 is a refrigerant pipe connecting the condenser and the outer pipe 12 and the outlet pipe 14 is a refrigerant pipe connecting the outer pipe 12 and the expansion valve 3.

The inner pipe 12 is formed by spirally forming a predetermined portion of a refrigerant pipe connecting the compressor 1 from the evaporator 4.

The outer pipe 12 is fitted to be in close contact with the outer side of the inner pipe 11 and both ends thereof are welded to the outer side of the inner pipe 11.

Accordingly, a high-temperature and high-pressure refrigerant discharged from the condenser 2 flows into the outer pipe 12 through the inlet pipe 13 and the refrigerant flowing in the outer pipe 12 flows through a plurality of spiral high-pressure channels 15 formed between the outer pipe 12 and the inner pipe 11 and then moves to the expansion valve 3 through the outlet pipe 14.

Further, the low-temperature low-pressure refrigerant discharged from the evaporator 4 passes through a low-pressure channel 16 in the inner pipe 11, in which the refrigerant passing through the inner pipe 11 and the refrigerant passing through the outer pipe 12 exchange heat with each other.

Thereafter, the refrigerant that has passed through the inner pipe 11 flows into the compressor 1.

However, according to the double-pipe internal heat exchanger 10, the heat transfer amount between the low-temperature low-pressure gas-state refrigerant flowing through the inner pipe 11 and the high-temperature high-pressure liquid-state refrigerant flowing through the outer pipe 12 has a large influence on the performance of the internal heat exchanger 10. As for the outer pipe 12, a refrigerant spirally flows through the spiral high-pressure channel 15, while, as for the inner pipe 11, a refrigerant flows straight through the low-pressure channel 16 and the heat transfer area is also small, whereby heat exchange performance is reduced.

Accordingly, there is a problem that it is required to increase the length of the double pipe in order to increase the heat exchange performance.

Therefore, various efforts for increasing a heat exchange area using various spiral pipes of an inner pipe and an outer pipe have been proposed, and particularly, there is a need for developing an internal heat exchanger double pipe of an air conditioning system having an alternative refrigerant applied thereto for regulations on alternative refrigerant/CO2.

DISCLOSURE

Technical Problem

An object of the present invention for solving the problems is to provide an internal heat exchanger double-tube structure that can improve heat exchange performance between a refrigerant flowing through an outer pipe and a refrigerant flowing through an inner pipe by making the outer pipe in a circular pipe shape and the inner pipe in a grooved spiral pipe shape to increase a heat exchange area by the spiral structure.

Another object of the present invention is to provide an internal heat exchanger double-tube structure that makes it possible to reduce the length of a double tube by improving heat exchange performance through a spiral structure of an inner pipe.

Another object of the present invention is to provide an internal heat exchanger double-tube structure that can improve the heat exchange performance between refrigerants flowing in an outer pipe and an inner pipe in consideration of the depth, gap (pitch), and shape of grooves and the direction of a spiral according to a spiral structure of the inner pipe.

Another object of the present invention is to provide an internal heat exchanger double-tube structure that can minimize resistance against flow of a refrigerant in a low-pressure pipe by minimizing the depth of grooves on a pipe according to a spiral structure of an inner pipe according to a channel through which a refrigerant flows.

Technical Solution

In order to achieve the objects of the present invention, an internal heat exchanger double-tube structure of an air conditioning system having an alternative refrigerant applied thereto for heat exchange between a low-temperature low-pressure refrigerant discharged from an evaporator and a high-temperature high-pressure refrigerant discharged from an condenser, includes: an inner pipe having a channel through which the low-temperature low-pressure refrigerant discharged from the evaporator flows; and an outer pipe surrounding the inner pipe and having a channel through which high-temperature high-pressure refrigerant flows, in which the inner pipe has a spiral groove forming a channel on an outer side thereof, and the spiral groove is a recessed groove for generating a vortex that increase a channel volume where high-temperature high-pressure liquid flows inward and reduces a vortex of flowing fluid.

The spiral groove may be formed to have a deep and wide volume ratio inside a recessed shape for generating a vortex such that a high-pressure side heat exchange area can be increased.

The spiral groove may have a recessed groove shape to be able to increase heat exchange performance between refrigerants according to channels of the inner pipe and the outer pipe, and may be a groove structure having a volume ratio considering a groove depth, a groove gap (pitch), a groove shape, and a direction of a spiral.

The spiral groove may be formed such that a center portion is high and slopes inclined from the center portion to left and right edges are formed in an inside cross-section.

Any one of the slopes may have a deeper groove shape.

An inner cross-section of the spiral groove may be formed in a wave shape that is high at a center portion and becomes lower to the left and right.

The spiral groove may be a vortex-shaped recessed groove having a wave shape "  " inward to increase a channel volume where high-temperature high-pressure liquid flows and reduce a vortex of flowing liquid.

Advantageous Effects

The present invention can provide an internal heat exchanger double-tube structure that can improve heat exchange performance between a refrigerant flowing through an outer pipe and a refrigerant flowing through an inner pipe by making the outer pipe in a circular pipe shape and the inner pipe in a grooved spiral pipe shape to increase a heat exchange area by the spiral structure.

Further, the present invention has an effect being able to reduce the length of a double tube by improving heat exchange performance due to the spiral structure of the inner pipe.

Further, the present invention has an effect being able to increase heat exchange performance between refrigerants according to the outer pipe and the inner pipe in consideration of a groove depth, a gap (pitch), a groove shape, and the direction of a spiral according to the spiral structure of the inner pipe.

Further, the present invention can minimize resistance against flow of a refrigerant in a low-pressure side pipe by minimize the depth of a groove on a pipe according to the spiral structure of the inner pipe according to a channel through which a refrigerant flows.

Further, the present invention provides a double tube in which the outer pipe is a circular pipe and the inner pipe is a spiral pipe with a groove having a vortex shape on the inner side, so a heat transfer area is increased by the groove having a vortex shape, whereby it is possible to improve heat exchange performance between a refrigerant flowing through the outer pipe and the refrigerant flowing through the inner pipe.

Further, since the heat exchange performance is improved, it is possible to reduce the length of the double tube, and accordingly, it is possible to make a compact air conditioning system.

DESCRIPTION OF DRAWINGS

FIGS. 1 to 11 show an embodiment of an internal heat exchanger double-tube structure of an air conditioning system having an alternative refrigerant applied thereto according to the present invention, in which

BEST MODE

Hereafter, a preferable embodiment of the present invention is described in detail with reference to the accompanying drawings.

The present invention is not limited to the following embodiment and may be achieved in various different ways, and the embodiment is provided to completely inform those skilled in the art of the scope of the present invention to completely describe the present invention.

Hereafter, a preferable embodiment of the present invention is described in detail with reference to the accompanying drawings. It should be noted that same components are denoted by the same reference numerals even if they are shown in different drawings. Further, in the following description, it is to be noted that, when the functions of conventional elements and the detailed description of elements related with the present invention may make the gist of the present invention unclear, a detailed description of those elements will be omitted FIGS. 1 to 11 show an embodiment of an internal heat exchanger double-tube structure of an air conditioning system having an alternative refrigerant applied thereto according to the present invention.

Referring to FIGS. 1 to 5 and FIG. 12, an internal heat exchanger double-tube 100 of an air conditioning system having an alternative refrigerant applied thereto according to the present invention, which is a double-tube structure for heat exchange between a low-temperature low-pressure refrigerant discharged from the evaporator 4 and a high-temperature high-pressure refrigerant discharged from the condenser s, includes an inner pipe 110 and an outer pipe 120 coupled to surround the inner pipe 120.

The inner pipe 110 has a channel 111 through which the low-temperature low-pressure refrigerant discharged from the evaporator 4 flows.

The outer pipe 120 has a channel 121 that surrounds the inner pipe 110 and through which a high-temperature high-pressure refrigerant discharged from the condenser 2 flows.

The inner pipe 110 has a spiral groove 112 to form a channel on the outer side and the spiral groove 112 is a recessed groove for generating a vortex in the longitudinal direction.

That is, the spiral groove 112 is a recessed groove having a vortex shape such as " ", thereby being increasing the channel volume of a place where high-temperature high-pressure liquid flows and applying a vortex to the flowing liquid. Accordingly, a vortex is generated in a refrigerant flowing through the channel by the recessed groove for generating a vortex.

Figure 6A:
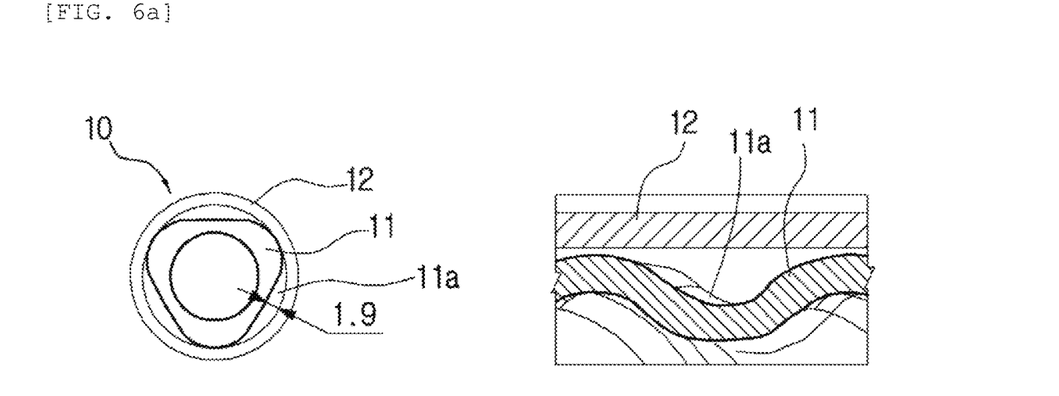
FIG. 6a is an exemplary cross-sectional view showing a side cross-section of a main part of a double tube having a fundamental spiral shape.
Figure 6B:
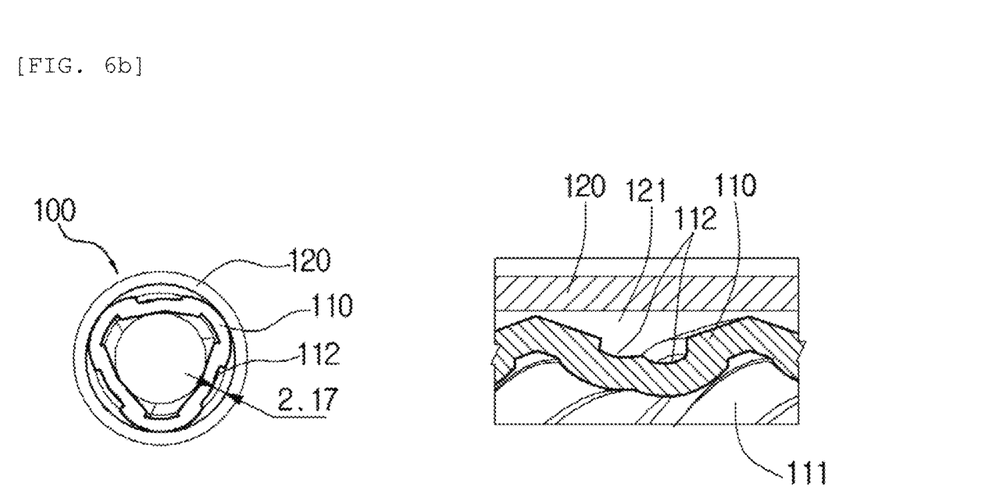
FIG. 6b is an exemplary cross-sectional view showing a side cross-section of the main part of the double tube according to the present invention.

Referring to FIGS. 6a and 6b, a spiral groove 11a formed on a common inner pipe of the related art is about 1.9 mm deep, but the spiral groove 112 of the present invention may be deeper, about 2.17 mm.

Figure 7A:
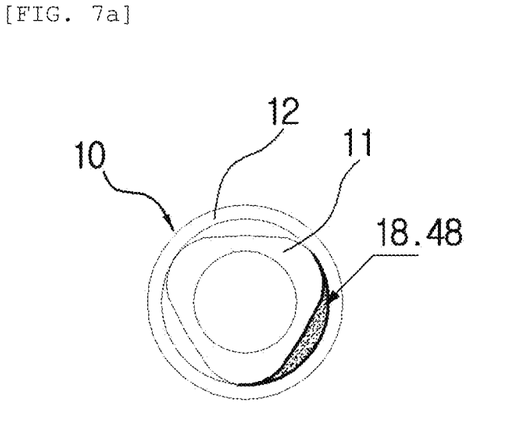
FIG. 7a is an exemplary view showing a cross-section of the main part of the double tube having a fundamental spiral shape, in which a volume area of a channel through which a refrigerant flows is shown.
Figure 7B:
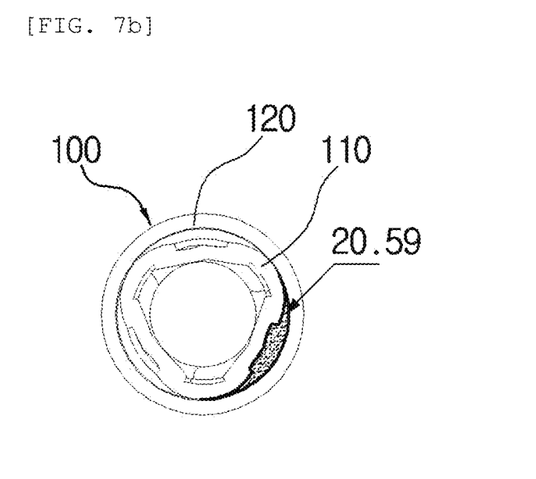
FIG. 7b is an exemplary view showing a cross-section of the main part of the double tube, in which a volume area of a channel through which a refrigerant flows is shown.

Further, referring to FIGS. 7a and 7b, in comparison to the channel between an outer pipe and an inner pipe combined in a common double tube, the spiral groove 11a formed on the inner pipe 11 having a fundamental spiral shape has a ratio of about 18.48 of the volume (area) to the depth of the spiral groove, but the spiral groove 112 of the double tube according to the present invention has a ratio of about 20.59 of the volume (area) to the depth with the inner side wider and deeper. Accordingly, the volume (area) of the place where high-temperature high-pressure fluid flows can be made larger and a recessed shape for generating a vortex is added to the spiral groove, whereby the volume efficiency of the channel can be maximized.

That is, the largest heat exchange occurs at the space in which a high-temperature high-pressure fluid flows, so the larger the channel volume (area), the better it is. Accordingly, it is preferable to increase the volume to the fundamental spiral groove and to give a spiral recessed groove such that flow can spirally flow. Accordingly, a high-temperature high-pressure refrigerant can maximally exchange heat with low-temperature low-pressure gas for predetermined time and under predetermined pressure throughout a predetermined length, thereby being able to increase heat exchange efficiency.

In other words, as a recessed groove for generating a vortex according to the spiral groove 112 of the inner pipe 110, it is preferable to give a volume ratio to make the inside of the spiral groove deeper such that a high-pressure side heat exchange area can be increased.

Accordingly, it is preferable for the spiral groove 112 to have a recessed groove structure for generating a vortex having a volume ratio considering a groove depth, a groove gap (pitch), a groove shape, and the direction of a spiral so that heat exchange performance between refrigerant according to the channels of the inner pipe 110 and the outer pipe 120 can be improved.

Figure 1:
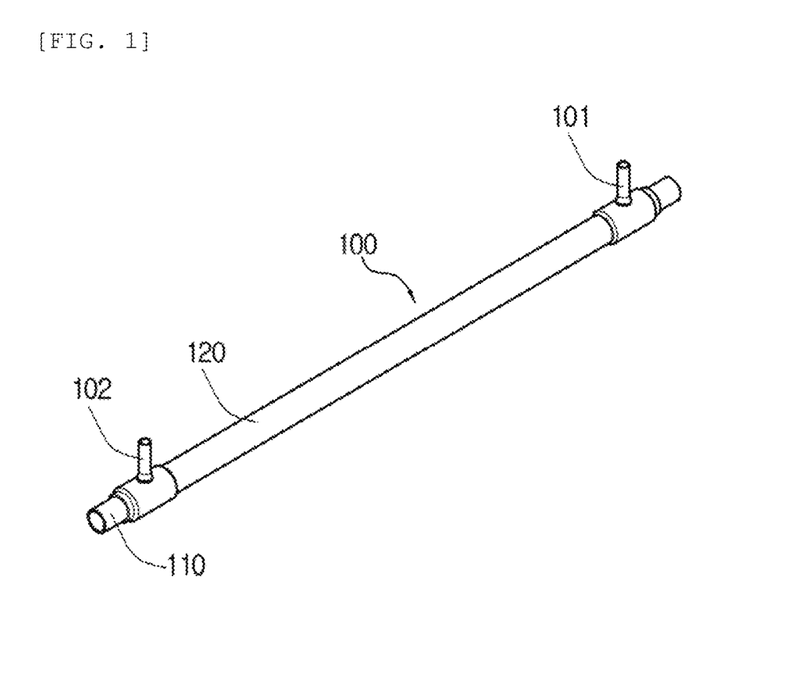
FIG. 1 is an entire perspective view showing a double tube according to the present invention.
Figure 2:
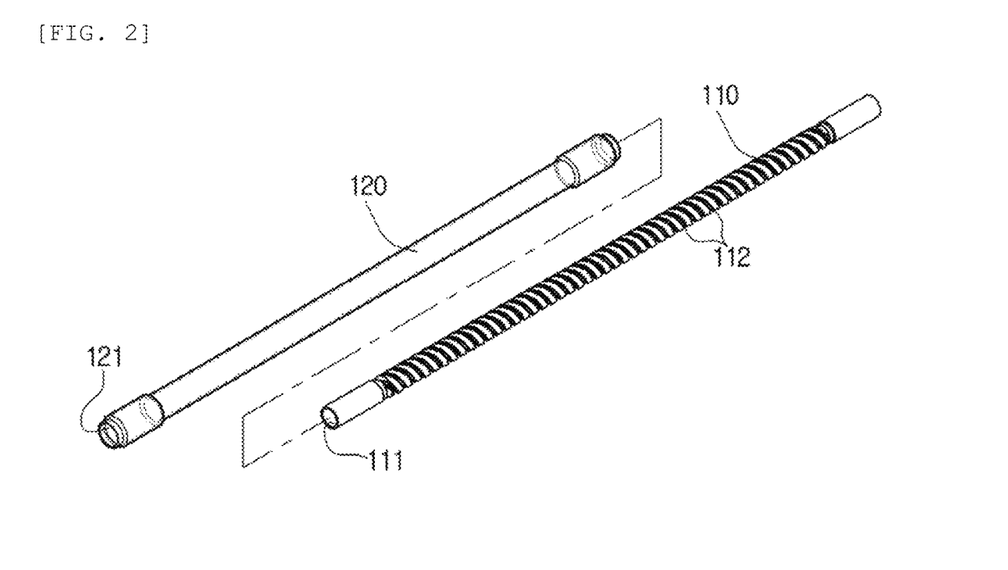
FIG. 2 is an entire exploded perspective view showing the double tube according to the present invention.
Figure 3:
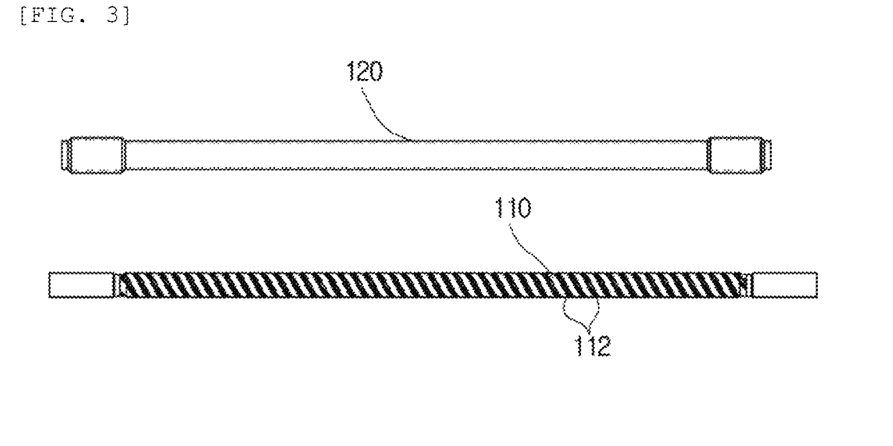
FIG. 3 is an entire front view showing the double tube according to the present invention.
Figure 4:
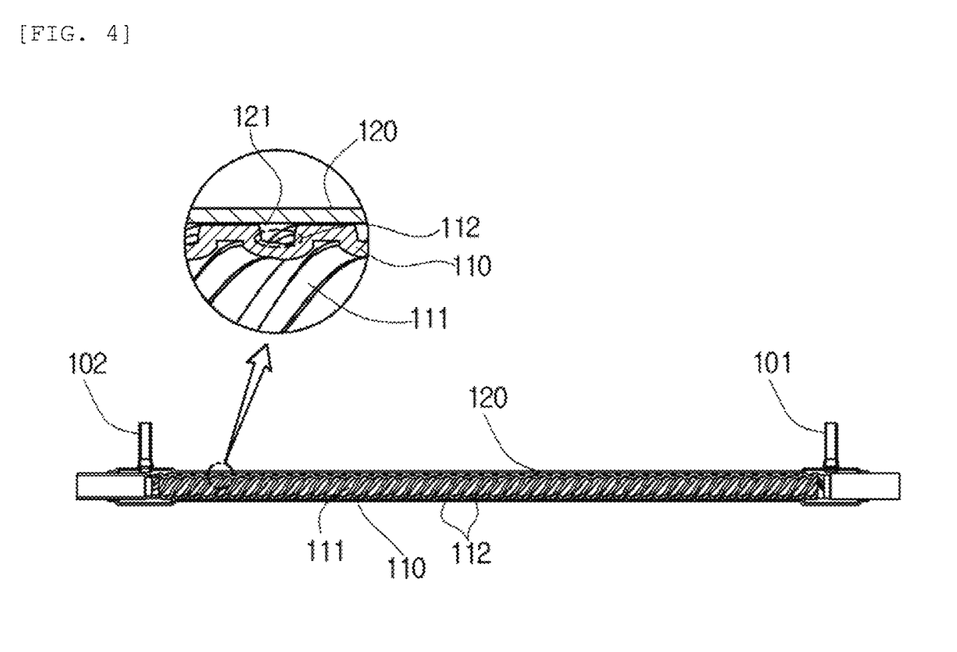
FIG. 4 is a cross-sectional view of a combination of the double tube according to the present invention and inner/outer pipes, including an exemplary enlarged cross-sectional view of main parts.
Figure 5:
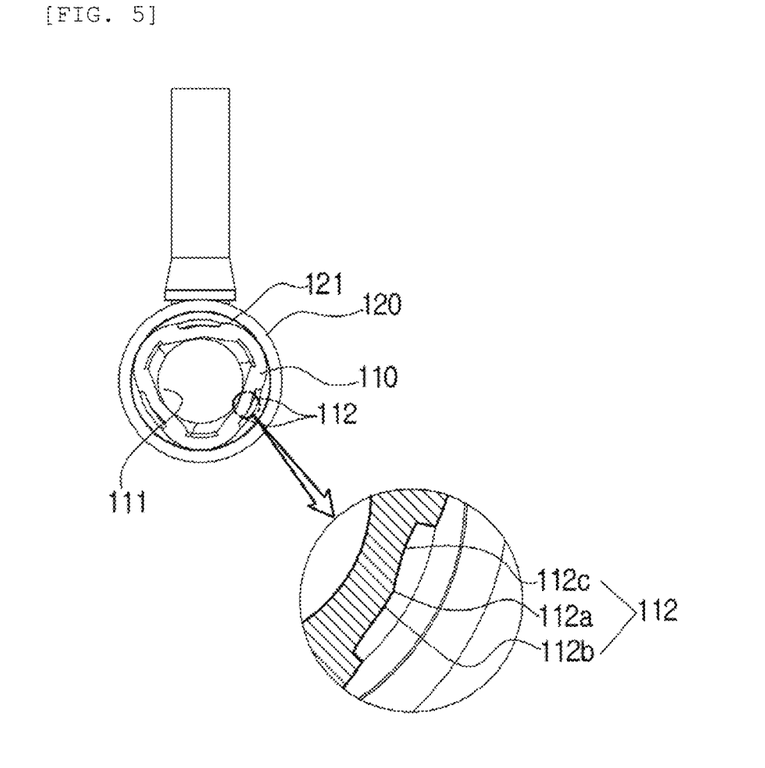
FIG. 5 is a side view showing a double tube for a heat exchanger according to the present invention.

Referring to FIG. 5, the spiral groove 112, which is a recessed groove for generating a vortex, may be configured such that a center portion 112a is high and wave-shaped slopes 112b and 112c are formed from the center portion 112a to the left and right edges in the inside cross-section.

Further, any one of the slopes 112b and 112c is formed in a deeper groove shape, so vertex effect of the refrigerant flowing through the channel can be maximized.

Hereafter, the operation effect according to the internal heat exchanger double-tube 100 of an air conditioning system having an alternative refrigerant applied thereto according to the present invention is described with reference to the configuration described above.

Figure 8:
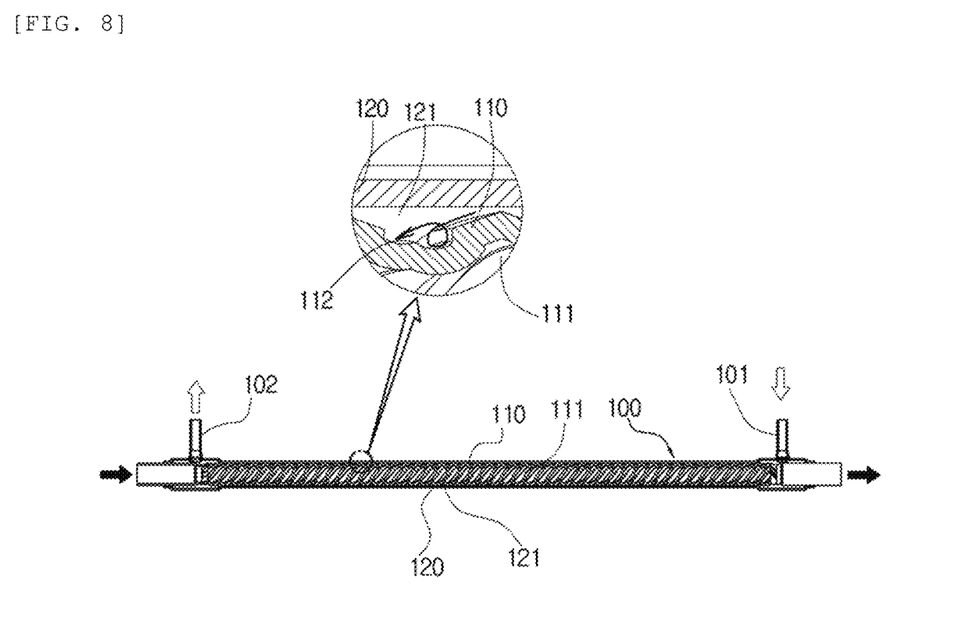
FIG. 8 is an operational exemplary view showing flow of a refrigerant in a double tube according to the present invention.
Figure 9A:
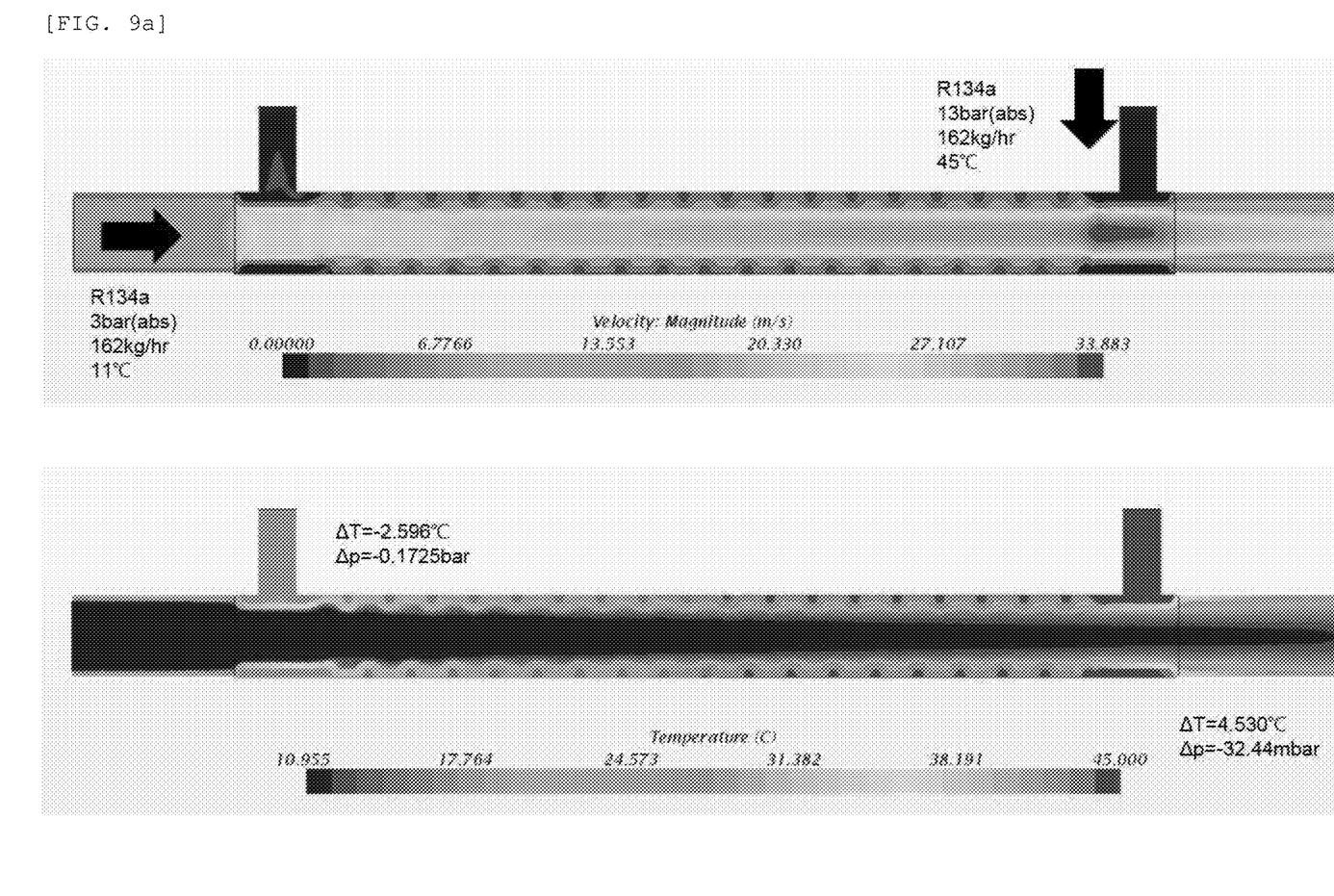
FIG. 9a is an exemplary view of a comparative experiment program in which heat exchange according to a double tube having a fundamental spiral shape is performed.
Figure 9B:
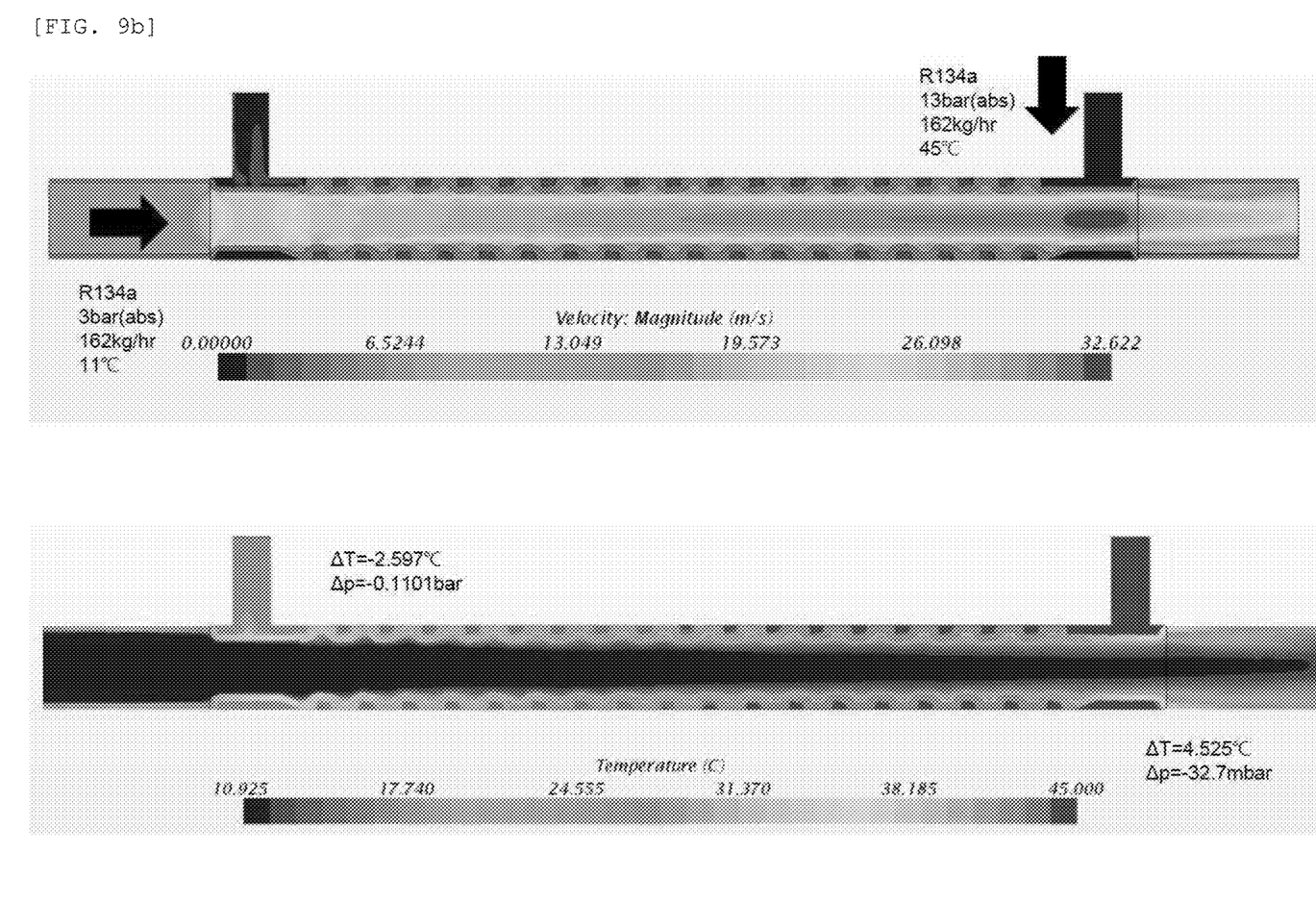
FIG. 9b is an exemplary view of a comparative experiment program in which heat exchange according to double tube of the present invention is performed.

FIG. 8 is an operational exemplary view showing flow of a refrigerant in a double tube according to the present invention, FIG. 9a is an exemplary view of a comparative experiment program in which heat exchange according to a double tube having a fundamental spiral shape is performed, FIG. 9b is an exemplary view of a comparative experiment program in which heat exchange according to double tube of the present invention is performed, and FIG. 10 is an exemplary view of another comparative experiment program in which heat exchange according to a double tube having a fundamental spiral shape and a double tube of the present invention is performed.

First, a high-temperature high-pressure liquid-state refrigerant discharge from the condenser 2 flows into the outer pipe 120 through an inlet pipe 101. The refrigerant flowing in the outer pipe 120 flows through several spiral channels 121 between the outer pipe 120 and the inner pipe 110 and then moves to the expansion valve 3 through an outlet pipe 102.

Further, a low-temperature low-pressure gas-state refrigerant discharged from the evaporator 4 passes through a channel 111 in the inner pipe 110, in which the refrigerant that has passed through the inner pipe 110 and the refrigerant that has passed through the outer pipe 120 exchange heat with each other.

Thereafter, the refrigerant that has passed through the inner pipe 110 flows into the compressor 1.

According to the internal heat exchanger double tube 100, the amount of heat transfer between the low-temperature low-pressure gas-state refrigerant flowing through the inner pipe 110 and the high-temperature high-pressure liquid-state refrigerant flowing through the outer pipe 120 has a large influence on the performance of the internal heat exchanger double tube 100.

That is, as for the outer pipe 120, a refrigerant spirally flows through a spiral channel 121, but as for the inner pipe 110, a refrigerant flows straight through a channel 112, in which heat exchange can occur.

The spiral groove according to the present invention is a recessed groove having a vortex shape maximizing volume efficiency, so high-temperature heat can be reduced as quickly and much as possible through heat circulation between low temperature and high temperature.

The result according to an experiment program of the double tube according to the present invention is described hereafter.

FIG. 9a is an exemplary view of a comparative experiment program in which heat exchange according to a double tube having a fundamental spiral shape and a double tube of the present invention is performed, in which temperature and pressure changes when low-temperature low-pressure of gas at 11° C. and high-temperature high-pressure fluid at 45° C. passes through a double tube having a fundamental spiral shape are shown first at the upper portion.

FIG. 9b shows temperature and pressure changes when low-temperature low-pressure of gas at 11° C. and high-temperature high-pressure fluid at 45° C. passes through a double tube and high-temperature high-pressure fluid at 45° C. passes through a double tube having a spiral groove according to the present invention, from which it can be seen that the temperature of the high-temperature high-pressure fluid dropped about −2.597° C. and the pressure thereof dropped −0.1101 bar. Further, it can be seen that the temperature of the w-temperature low-pressure of gas increased 4.525° C. and the pressure thereof dropped −32.7 mbar.

FIG. 10 is an exemplary view of another comparative experiment program in which heat exchange according to a double tube having a fundamental spiral shape and a double tube of the present invention is performed, in which a heat transfer coefficient and a heat exchange rate are high at the inside of the spiral groove of an inner pipe, as the blue color is less at the inside the groove in the test program. It can also be seen from this test program that as it goes from blue to red, the heat exchange rate increases.

In other words, in an air conditioning system necessarily requiring an alternative refrigerant to improve the performance, the system performance is reduced because the alternative refrigerant is lower in latent heat of evaporation than the existing refrigerant, but an internal heat exchanger generating heat exchange between low pressure and high pressure can offset the reduction of performance. It may be a very important factor that can improve heat exchange performance between a refrigerant flowing through an outer pipe and a refrigerant flowing through the inner pipe in a spiral groove structure of a double tube for increasing heat exchange performance.

Figure 11:
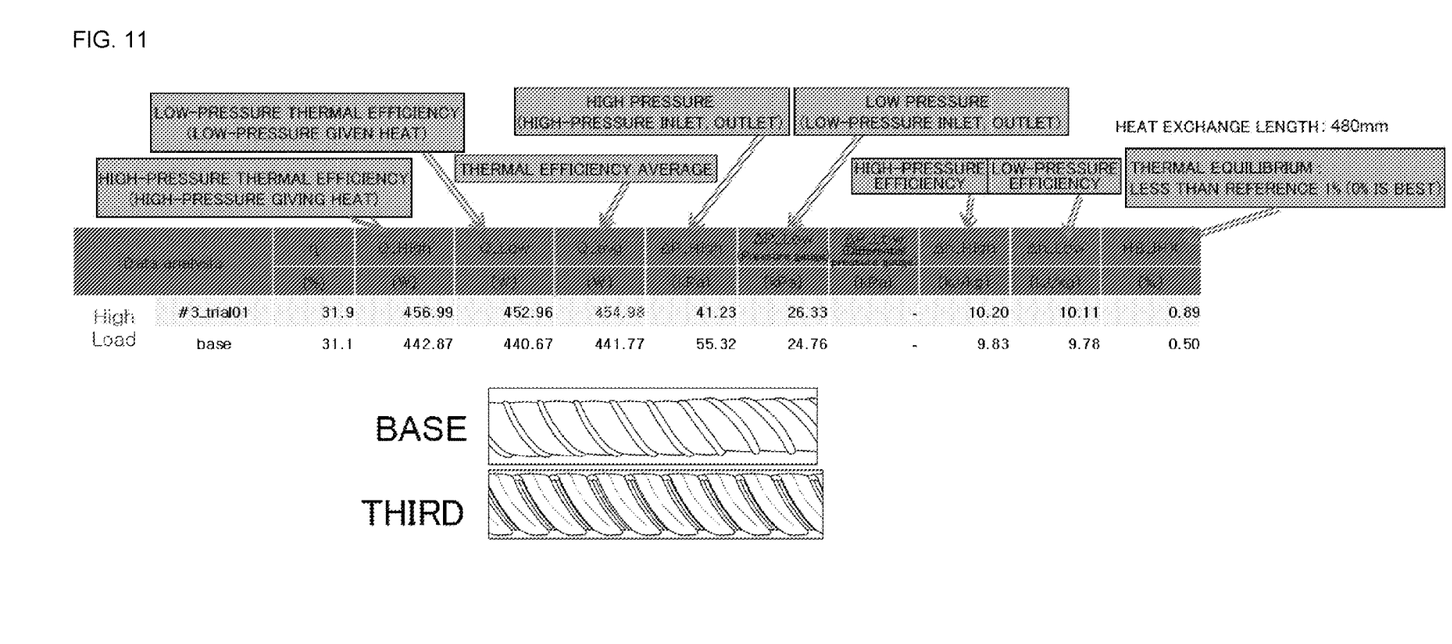
FIG. 11 is an exemplary table showing an internal heat exchanger test result according to a double-tube structure of the present invention.
Figure 12:
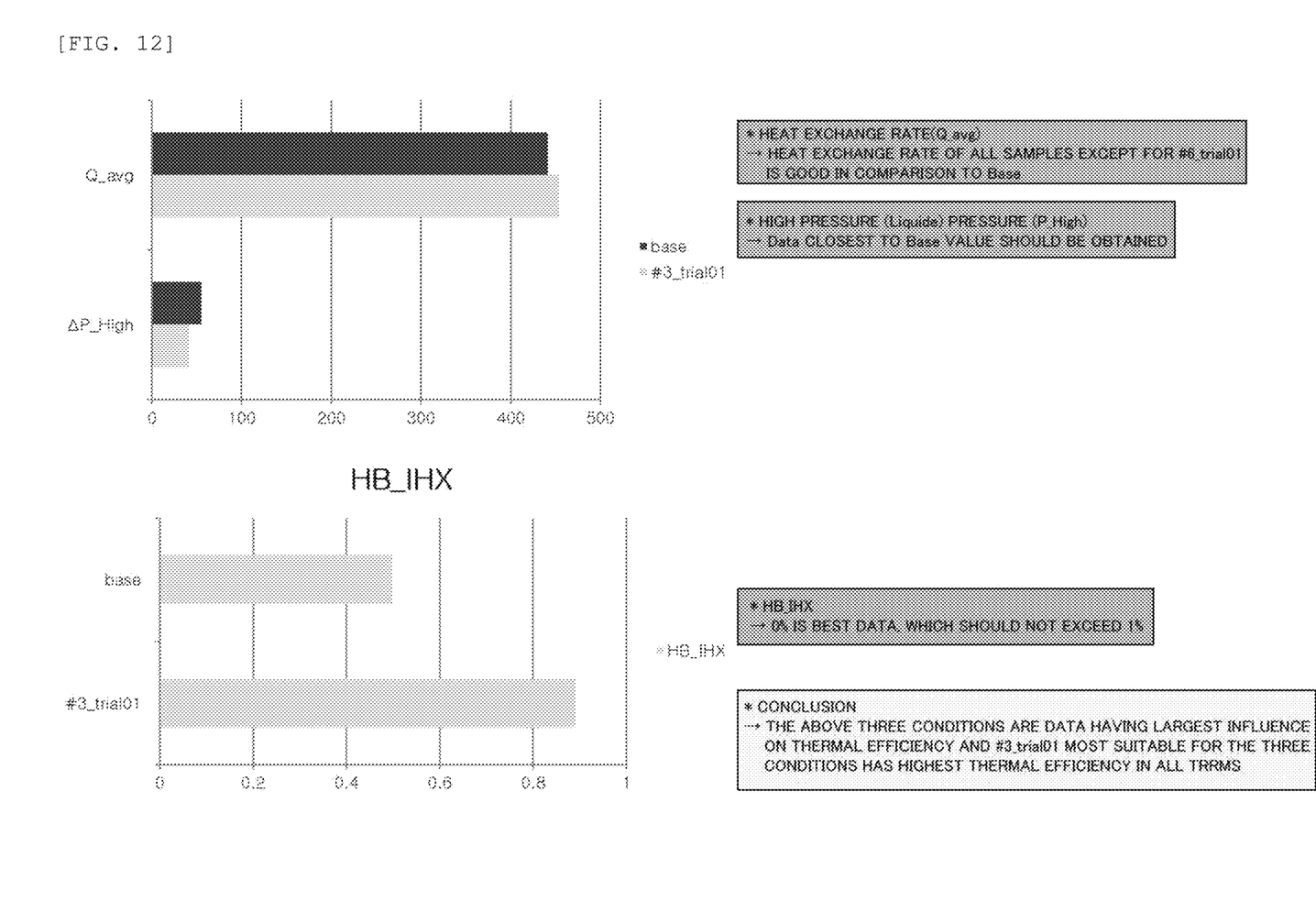
FIG. 12 is a test result graph showing data according to the exemplary table of FIG. 11.

FIG. 11 is an exemplary table showing an internal heat exchanger test result according to a double-tube structure of the present invention and FIG. 12 is a test result graph showing data according to the exemplary table of FIG. 11.

Referring to FIGS. 11 and 12, as for thermal efficiency average (heat exchange rate), the heat exchange rate of the third sample is better than that of a base sample from the table and graph.

Data closest to a base sample value is required to obtain high pressure and thermal equilibrium is less than 1% and should not exceed reference 1%, but 0% is best data.

As a result, three conditions of thermal efficiency average, high pressure, and thermal equilibrium are data that have largest influence on thermal efficiency and it can be seen that the third sample of the present invention that is the most suitable for the three conditions has best thermal efficiency in all terms.

As described above, according to the present invention, it is possible to increase the performance of an internal heat exchanger by increasing heat exchange efficiency by about 0.8% in the internal heat exchanger having reference 505W, a double-tube length of 600 mm, a heat exchange length of 480 mm by the recessed groove for generating a vortex according to the spiral groove of a double tube.

Although the present invention was described above with reference to preferable embodiments, the present invention is not limited to the embodiments and may be changed and modified in various ways by those skilled in the art without departing from an equivalent range of the spirit of the present invention and claims to be described below.

The invention claimed is:

1. An internal heat exchanger double-tube structure of an air conditioning system having an alternative refrigerant applied thereto for heat exchange between a low-temperature low-pressure refrigerant discharged from an evaporator and a high-temperature high-pressure refrigerant discharged from a condenser, the double-tube structure comprising:
   an inner pipe having a channel through which the low-temperature low-pressure refrigerant discharged from the evaporator flows; and
   an outer pipe surrounding the inner pipe and having a channel through which high-temperature high-pressure refrigerant flows,
   wherein the inner pipe has a spiral groove forming a channel on an outer side thereof,
   wherein a recessed groove is formed on an outer surface of the spiral groove for generating a vortex, the recessed groove comprising:
      a single center portion protruded radially outward and formed along a direction of the spiral groove; and
      a left and a right slope inclined from the single center portion to left and right edges of the spiral groove,
      wherein each of the left and the right slopes has a groove shape and one of the left and the right slopes has a greater groove shape than the other,
      wherein an entire outer surface of the single center portion and the left and the right slopes is directly exposed to an inner surface of the outer pipe.

2. The internal heat exchanger double-tube structure of an air conditioning system having an alternative refrigerant applied thereto of claim 1, wherein the recessed groove is able to increase heat exchange performance between refrigerants according to channels of the inner pipe and the outer pipe according to a groove depth, a groove gap, a groove shape, and a direction of a spiral.

3. The internal heat exchanger double-tube structure of an air conditioning system having an alternative refrigerant applied thereto of claim 1, wherein the single center portion and the left and the right slopes are formed of a wave shape that is high at a center portion and becomes lower to the left and right.

4. The internal heat exchanger double-tube structure of an air conditioning system having an alternative refrigerant applied thereto of claim 1, wherein the recessed groove having a wave shape inward increases a channel volume where high-temperature high-pressure liquid flows and reduce a vortex of flowing liquid.

* * * * *